(12) United States Patent
Tominaga et al.

(10) Patent No.: US 6,577,030 B2
(45) Date of Patent: Jun. 10, 2003

(54) ELECTRIC POWER STEERING APPARATUS

(75) Inventors: Tsutomu Tominaga, Tokyo (JP); Tadayuki Fujimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/846,333

(22) Filed: May 2, 2001

(65) Prior Publication Data
US 2002/0060105 A1 May 23, 2002

(30) Foreign Application Priority Data
Oct. 18, 2000 (JP) ......................................... 2000-318309

(51) Int. Cl.[7] .............................................. H02K 11/00
(52) U.S. Cl. .......................... 310/68 B; 310/71; 310/84; 310/64; 310/DIG. 6; 318/488; 318/489; 318/648
(58) Field of Search ................................. 310/68 B, 71, 310/89, 64; H02K 5/14

(56) References Cited

U.S. PATENT DOCUMENTS

| | | | | |
|---|---|---|---|---|
| 5,299,649 A | * | 4/1994 | Sano et al. ................. 180/400 |
| 5,406,155 A | * | 4/1995 | Persson ...................... 310/171 |
| 5,517,067 A | * | 5/1996 | Sata ..................... 310/40 MM |
| 5,570,961 A | * | 11/1996 | Osada et al. ................ 347/174 |
| 5,844,386 A | * | 12/1998 | Matsuoka et al. .......... 318/293 |
| 5,913,375 A | * | 6/1999 | Nishikawa .................. 180/167 |
| 5,959,385 A | * | 9/1999 | Kato et al. .................. 310/112 |
| 6,078,155 A | * | 6/2000 | Tominaga et al. .......... 318/293 |
| 6,107,712 A | * | 8/2000 | Yamamura et al. ..... 200/11 DA |
| 6,107,716 A | * | 8/2000 | Penketh ....................... 180/443 |
| 6,123,167 A | * | 9/2000 | Miller et al. ................ 180/444 |
| 6,268,669 B1 | * | 7/2001 | Wakao et al. ............... 180/443 |
| 6,282,797 B1 | * | 9/2001 | Osada et al. ................. 30/392 |

FOREIGN PATENT DOCUMENTS

| | | | | |
|---|---|---|---|---|
| DE | 04315404 A1 | * | 11/1994 | |
| JP | 8-192757 | | 7/1996 | ............ B62D/5/04 |
| JP | 9-30434 | | 2/1997 | ............ B62D/5/04 |
| JP | 9-117093 | | 5/1997 | ............ H02K/5/14 |
| JP | 11115776 A | * | 4/1999 | ............ B62D/5/04 |
| JP | 2001063595 A | * | 3/2001 | ............ B62D/5/04 |

* cited by examiner

*Primary Examiner*—Nestor Ramirez
*Assistant Examiner*—J. Aguirrechea
(74) *Attorney, Agent, or Firm*—Sughrue Mion, PLLC

(57) ABSTRACT

An electric power system having an electric motor, a speed-reduction mechanism, a power board on which components generating heat are mounted, a control board on which components generating little heat are mounted, a circuit case, and a heat sink for dissipating heat from the power board. A conductive board for wiring is insert-molded in the circuit case. The power board is brought into intimate contact with the heat sink. The circuit case is mounted to the heat sink so as to cover the power board. The control board is mounted to the circuit case. The power board, the circuit case, and the control board are stacked on top of each other in this order to constitute a controller. The motor is mounted to the heat sink by support members. The heat sink is mounted to the speed-reduction mechanism.

10 Claims, 15 Drawing Sheets

ELECTRIC POWER STEERING APPARATUS

BACKGROUND OF THE INVENTION

1. Field of the Invention

The present invention relates to an automotive electric power steering apparatus for applying an assisting force to the steering wheel of a vehicle and, more particularly, to an electric power steering apparatus that provides excellent productivity and reliability.

2. Description of the Related Art

FIG. 14 shows the structure of a general electric power steering apparatus. FIG. 15 is a block diagram of a driver circuit for the electric power steering apparatus. In FIG. 14, a vehicle has a steering wheel 1 that is a steering device. A torque sensor 2 detects the steering torque applied to the steering wheel 1. A vehicle speed sensor 3 detects the speed of the vehicle. An electric motor 4 generates a steering assisting force. A control means 5 receives the output signals from the torque sensor 2 and from the vehicle speed sensor 3 and controls the motor 4 according to the steering torque and the operating conditions of the vehicle to thereby control the value and the direction of the steering assisting torque. A battery 6 is an electric power source for the electric power steering apparatus and supplies a power-supply voltage to the torque sensor 2, vehicle speed sensor 3, motor 4, and control means 5. The circuit configuration of the electric power steering apparatus made up of these components is shown in FIG. 15.

FIG. 15 shows an example of a circuit configuration of an electric power steering apparatus using a brushless motor as the motor 4. An electric motor 4 includes a rotor (not shown) made of a magnet, three-phase armature windings 7 wound around a stator, and an angular position sensor 8 for detecting the angular position of the rotor. A control means 5 includes a microcomputer (CPU) 9, a driver circuit 10, a large capacitor 11 for removing ripples from the electric current flowing through the motor 4, a shunt resistor 12 for detecting the current flowing through the motor 4, a current-detecting means 13 for detecting the current value from a voltage drop developed across the shunt resistor 12, and a switching means 14 for switching on or off the current flowing through the motor 4. The CPU 9 receives the output signals from the torque sensor 2, from the vehicle speed sensor 3, and the angular position sensor 8 and controls the motor 4. The driver circuit 10 controls semiconductor switching elements Q1–Q6 connected in a three-phase bridge form according to a signal from the CPU 9.

In the general electric power steering apparatus of the construction described above, the CPU 9 receives the output signal from the torque sensor 2 that indicates the steering torque. Also, the CPU 9 receives the output signal from the vehicle speed sensor 3 that indicates the speed of the vehicle. The CPU calculates corresponding assisting torque value and driving direction and delivers output signals indicating the calculated values to the driver circuit 10. This driver circuit 10 furnishes pulse width-modulated (PWM) signals to the semiconductor switching elements Q1–Q6 and supplies three-phase alternating power to the motor 4. The CPU 9 receives a current value signal from the current-detecting means 13 and the angular position signal from the angular position sensor 8 to provide feedback. The CPU 9 provides such a control that an appropriate driving current corresponding to both steering torque and vehicle speed is supplied to the motor 4. The circuit of the switching means 14 controlled by the driver circuit 10 is closed normally. The circuit is opened when an abnormality takes place.

In this electric power steering apparatus, the torque sensor 2, the vehicle speed sensor 3, the motor 4, and the battery 6 are installed inevitably in the automotive engine compartment. On the other hand, the control means 5 is normally mounted in the passenger compartment. Therefore, a long wiring harness is necessary to connect them. This wiring harness increases the weight and cost. In addition, the harness leads to power loss and gives rise to radiation noise due to current flowing through the pulse width-modulated motor 4. This radiation noise may malfunction other control devices and induces noise in the automotive radio.

In view of these problems, techniques for eliminating a part of the wiring harness to thereby shorten it have been proposed. In particular, the control means 5 and the motor 4 are integrated as a subassembly, which in turn is mounted in the engine compartment. For example, in the technique disclosed in Japanese laid-open patent No. 30434/1997, a metal case is interposed between a DC brush motor and a speed-reduction mechanism for reducing the speed of rotation of the motor. A single metal substrate or board is disposed in this metal case. The control means 5, the semiconductor switching elements Q1–Q6, and the brush holder of the motor are mounted on this board. This technique disclosed in this Japanese laid-open patent reduces radiation noise and takes account of heat dissipation. However, the motor itself is inevitably made bulky. Especially, it has an extremely large radial dimension. This deteriorates the ease with which the motor is mounted to the steering mechanism. During mounting operation, the spaces assigned to surrounding parts are inevitably sacrificed.

Furthermore, Japanese laid-open patent No. 192757/1996 discloses a technique having a metal case mounted between a brush DC motor and a speed-reduction mechanism that reduces the rotational speed of a motor. Semiconductor switching elements Q1–Q6 and the brush holder of the motor are received in this case. A casing that houses a control means 5 is mounted radially adjacent to the metal case. In the same way as the previously mentioned known technique, large radial space is necessary. The motor is not easily mounted to the steering mechanism. In addition, the electric power steering apparatus itself is fabricated with decreased productivity.

Additionally, Japanese laid-open patent No. 117093/1997 discloses a technique for use with an electric power steering apparatus using a brush DC motor. This technique uses a substrate or board on which a control means 5 and switching elements Q1–Q6 are mounted. This board is held to an external case on which the brush holder of an electric motor is mounted. The external case holding the board is located at a side of the motor within the housing of the motor. This technique permits simplification of wiring leads among components. Also, increase in size can be suppressed to some extent. However, the semiconductor switching elements are located beside the motor that produces heat. In addition, the switching elements are mounted within the housing of the motor. Therefore, the thermal reliability presents problems. Furthermore, the current-carrying capacity of the semiconductor switching elements is limited. Additionally, limitations are placed on the increase of the output of the motor. Also, the productivity poses problems.

SUMMARY OF THE INVENTION

The present invention has been made to solve the foregoing problems. It is an object of the invention to provide an electric power steering apparatus which reduces radiation noise due to PWM drive and permits higher output power, improvement of productivity, and weight reduction.

An electric power steering apparatus in accordance with the present invention comprises:

an electric motor having an output shaft;

a speed-reduction mechanism for reducing rotational speed of said output shaft of said motor;

a power circuit board having power circuit parts mounted thereon, said power circuit parts including semiconductor switching elements for supplying electric power to said electric motor;

a control circuit board having general circuit parts generating little heat, said general circuit parts including a microcomputer for controlling said semiconductor switching elements according to an output signal from a torque sensor for measuring steering torque and according to an output signal from a vehicle speed sensor for measuring vehicle speed;

a circuit case body including an insert-molded wiring conductors and having a first connector adapted to connect with said torque sensor, a second connector adapted to connect said vehicle sensor and a third connector adapted to receive an electric power supplied from outside, said first, second and third connectors are integrally molded with said circuit case body;

a heat sink for dissipating heat from said power circuit parts on said power circuit board, said heat sink being mounted to said speed-reduction mechanism;

a controller formed by said power circuit board, said control circuit board and said circuit case body;

wherein said power circuit board and said control circuit board being located opposite to each other along the axis of said output shaft of said electric motor within said circuit case body of said controller; and said electric motor and said heat sink are combined in such a way that said controller is sandwiched between said electric motor and said heat sink.

According this structure, the controller and the motor can be assembled and tested separately. Then, they can be integrated. This secures high productivity and reliability. External wire leads can be shortened. Power loss and radiation noise are decreased. Furthermore, only components consuming only small amounts of current are packed on the control circuit board. Components consuming large amounts of current are packed on the power circuit board. Heat generated by the power circuit board and by the motor is dissipated through both heat sink and speed-reduction mechanism. Consequently, a small-sized, electric power steering apparatus having excellent heatproofness and capable of coping with increase in the output of the motor can be obtained.

In one feature of the electric power steering apparatus according with this invention, said heat sink and said speed-reduction mechanism have their respective fitting portions fitted together and mounted coaxially, and wherein said electric motor and said heat sink are combined coaxially.

According this feature, rotation of the motor is transmitted smoothly to the worm gear. In consequence, noise and vibrations can be reduced.

In another feature of the electric power steering apparatus according with this invention, (A) said first, second and third connectors are arranged in a line substantially perpendicularly to the axis of said electric motor, (B) said first connector is located between said second and third connectors, and (C) external leads to be connected with said second and third connectors, respectively, are connected in a direction substantially parallel to the axis of said output shaft of said electric motor at outside of said electric motor.

According this feature, during assembly of the vehicle, wiring operation can be easily performed. The space occupied by the wiring can be reduced.

In further feature of the electric power steering apparatus according with this invention, said heat sink, said power circuit board, and said control circuit board are provided with shaft holes through which said output shaft of said electric motor passes, and wherein the shaft holes in said heat sink and in said power circuit board are set larger in diameter than the shaft hole in said control circuit board.

According this feature, during assembly using a jig, this structure prevents the jig from interfering with the output shaft holes in the heat sink and in the power board. Hence, deformation of the power board and solder cracks can be prevented.

In a still other feature of the electric power steering apparatus according with this invention, the electric power steering apparatus further comprises an angular position sensor to measure the angular position of said electric motor, said angular position sensor includes;

(A) a permanent magnet magnetized into multiple poles mounted on said output shaft of said electric motor, and (B) a magnetic detecting device disposed on said control circuit board.

According this feature, the electric power steering apparatus dispenses with connectors and wire leads that would normally be used to connect the magnetic sensor with the control board. As a consequence, malfunctions due to noise transmitted through the leads can be prevented.

In an additional feature of the electric power steering apparatus according with this invention, a capacitor for absorbing current ripples flowing through said electric motor is mounted on a peripheral portion of said power circuit board and located in a cutout portion formed in said control circuit board.

According this feature, the space between the power board and the control board can be reduced. This leads to miniaturization of the power steering apparatus.

In a still other feature of the electric power steering apparatus according with this invention, wherein (A) said electric motor includes motor winding terminals extending from said electric motor toward said heat sink, (B) said insert-molded wiring conductors includes winding terminals connected with said motor winding terminals at the inner side of the fitting portions of said heat sink and said speed-reduction mechanism fitted together.

According this feature, a cover is mounted on the inner side of the fitting portion of the heat sink. The connected portions can be protected against protrusion of foreign materials.

In a yet additional feature of the electric power steering apparatus according with this invention, the electric power steering apparatus further comprises a current detecting means is mounted on said control circuit board near a position at which said winding terminals connected with said motor winding terminals, and wherein an electrical current flowing through said electric motor is detected, based on the current flowing through said motor winding terminal.

According this feature, wire leads for detecting an electrical current are dispensed with. Consequently, the size of the power steering system can be reduced.

In a yet further feature of the electric power steering apparatus according with this invention, said motor winding terminals includes a U-shaped portion, and said current detecting means includes a magnetic current detecting device disposed on said control circuit board at the one side of said U-shaped portion, and a magnetic collector made of a ferromagnetic material disposed on opposite side of the U-shaped portion.

According this feature, the magnetic flux can be concentrated effectively. Consequently, the accuracy at which an electrical current is measured can be improved.

In a still further feature of the electric power steering apparatus according with this invention, said current detecting means includes a C-shaped magnetic collector made of a ferromagnetic material forming a opening between its both opening ends and a magnetic current detecting device mounted on said control circuit board within said opening of said C-shaped magnetic collector, and wherein said motor winding terminals includes a U-shaped portion magnetic coupled with said C-shaped magnetic collector.

According this feature, the magnetic flux can be effectively concentrated. The accuracy at which an electrical current is measured can be enhanced.

Other objects and features of the invention will appear in the course of the description thereof, which follows.

DESCRIPTION OF THE PREFERRED EMBODIMENTS

Embodiment 1

Figure 1:
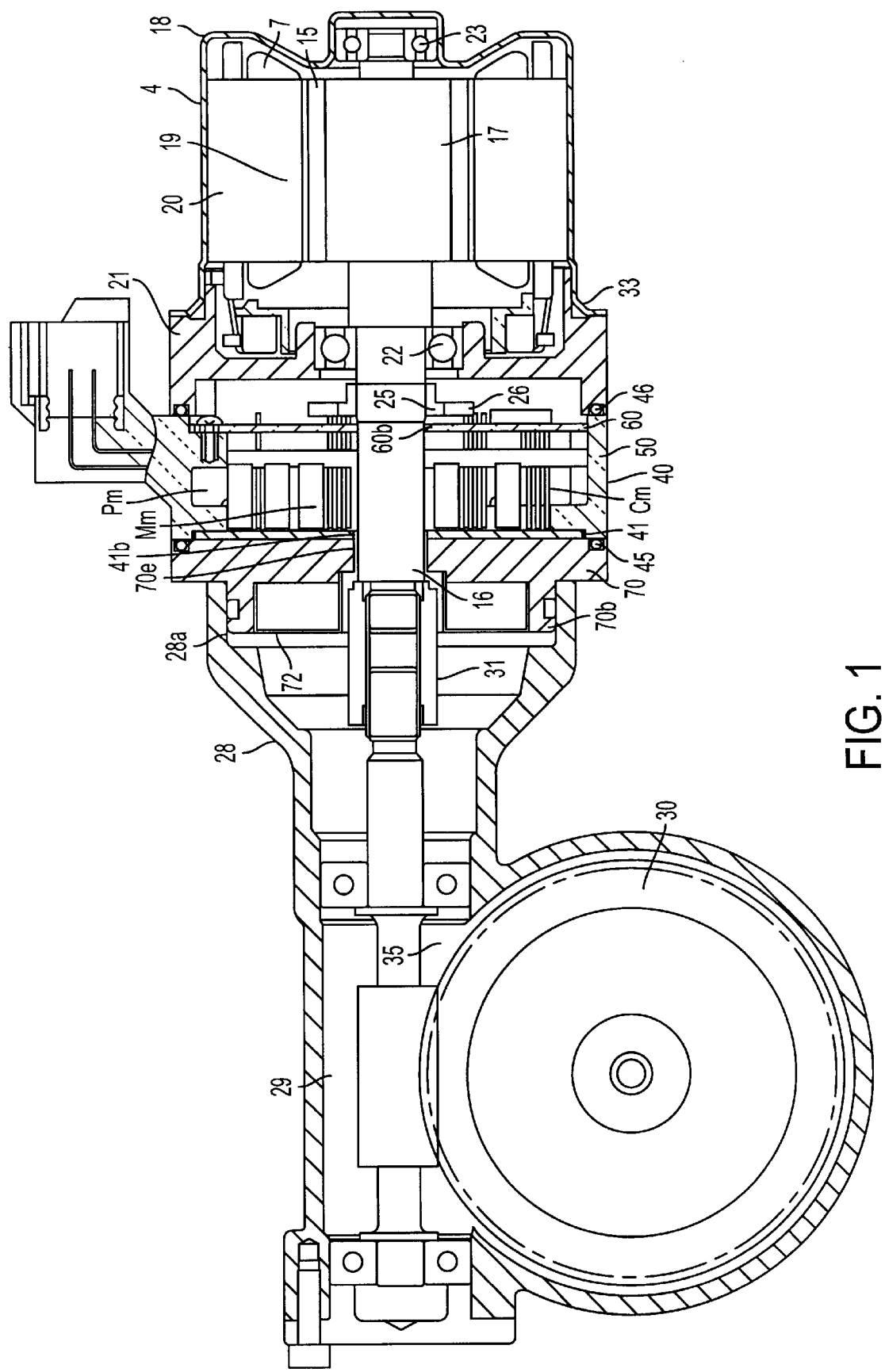
FIG. 1 is a cross-sectional view of an electric power steering apparatus in accordance with Embodiment 1 of the present invention.
Figure 2:
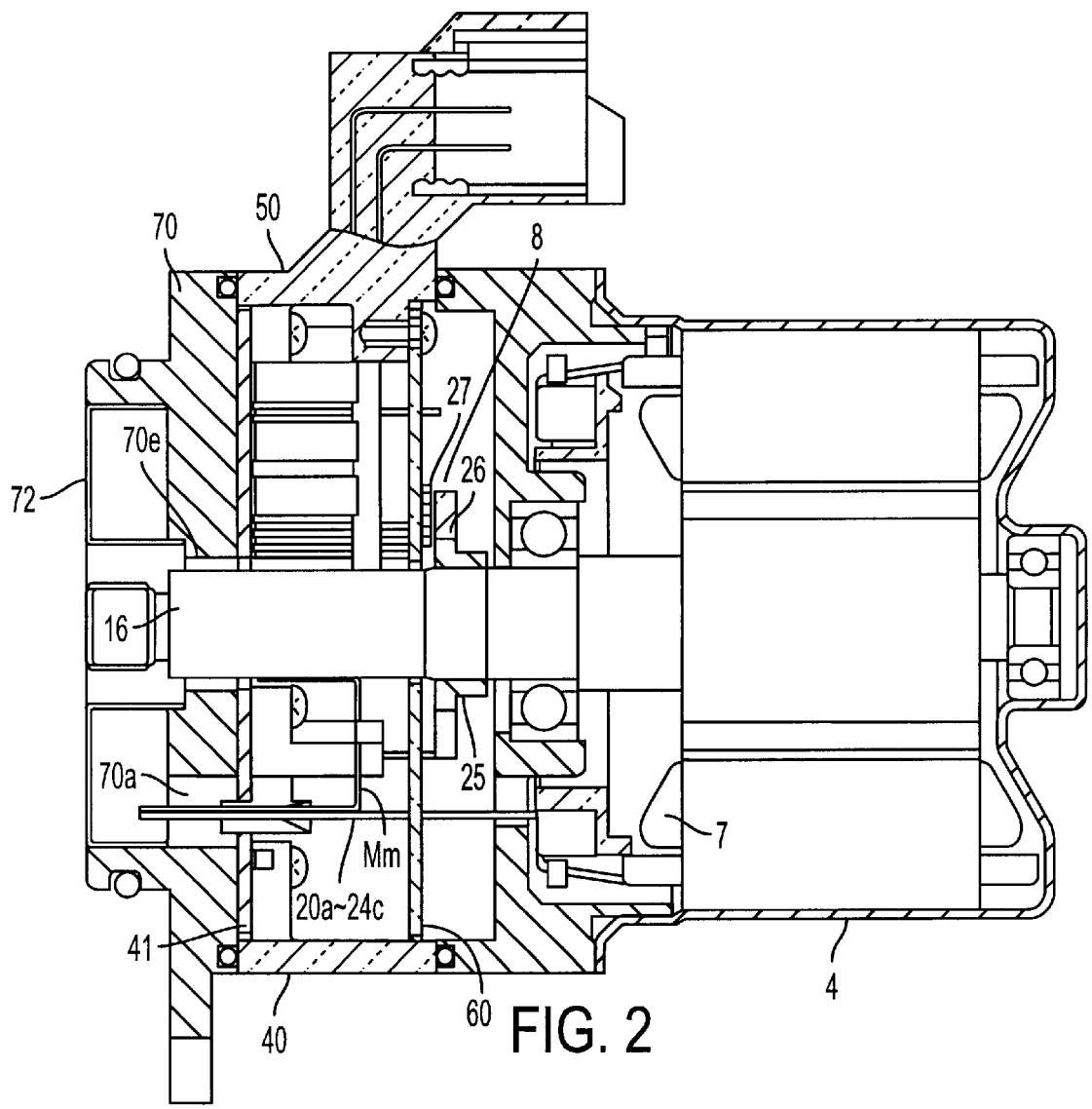
FIG. 2 is an enlarged cross section of the motor portion and the control portion of the electric power steering apparatus shown in FIG. 1.
Figure 3:
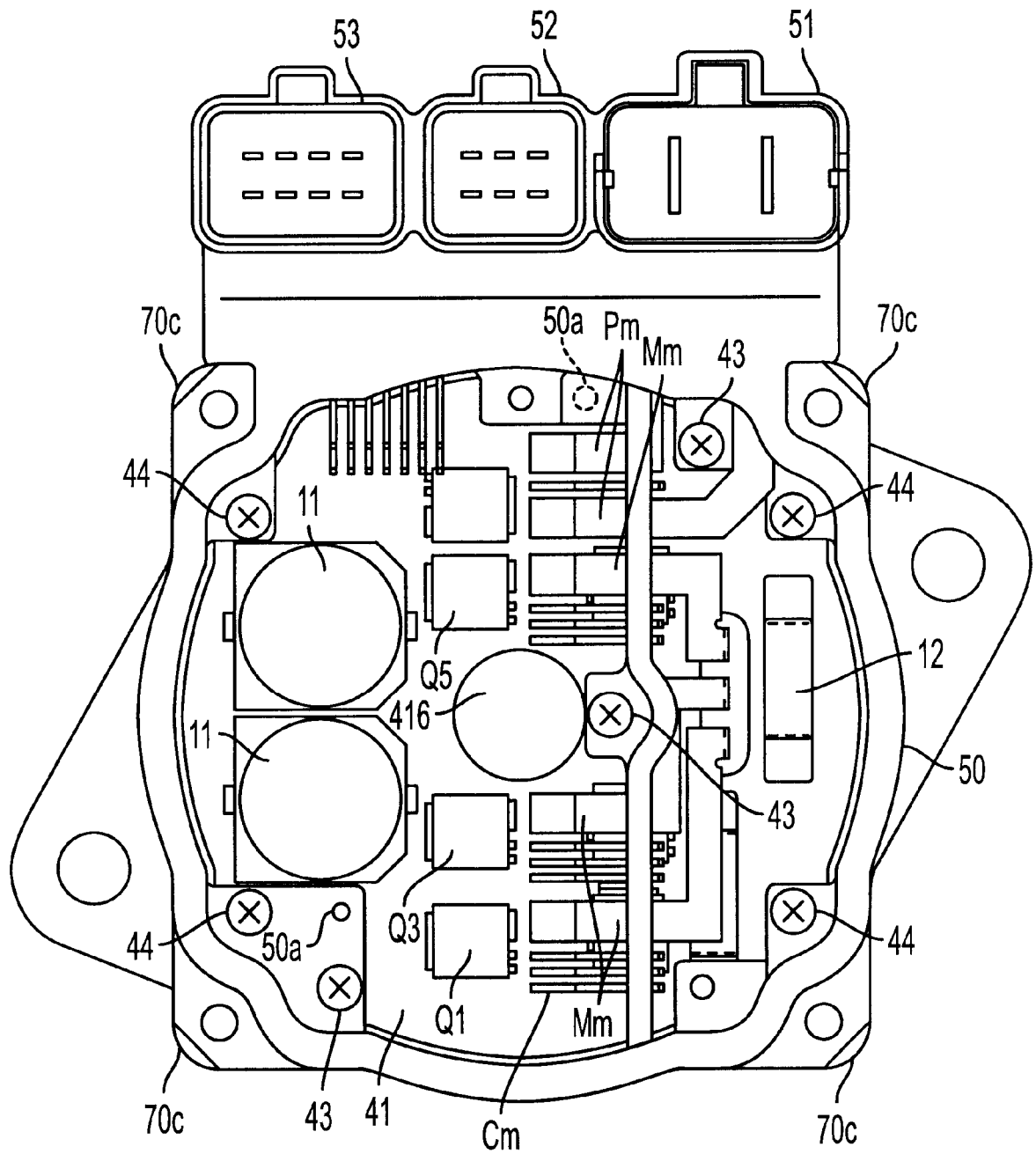
FIG. 3 is a plan view of the power board portion of the electric power steering apparatus shown in FIG. 1.
Figure 4:
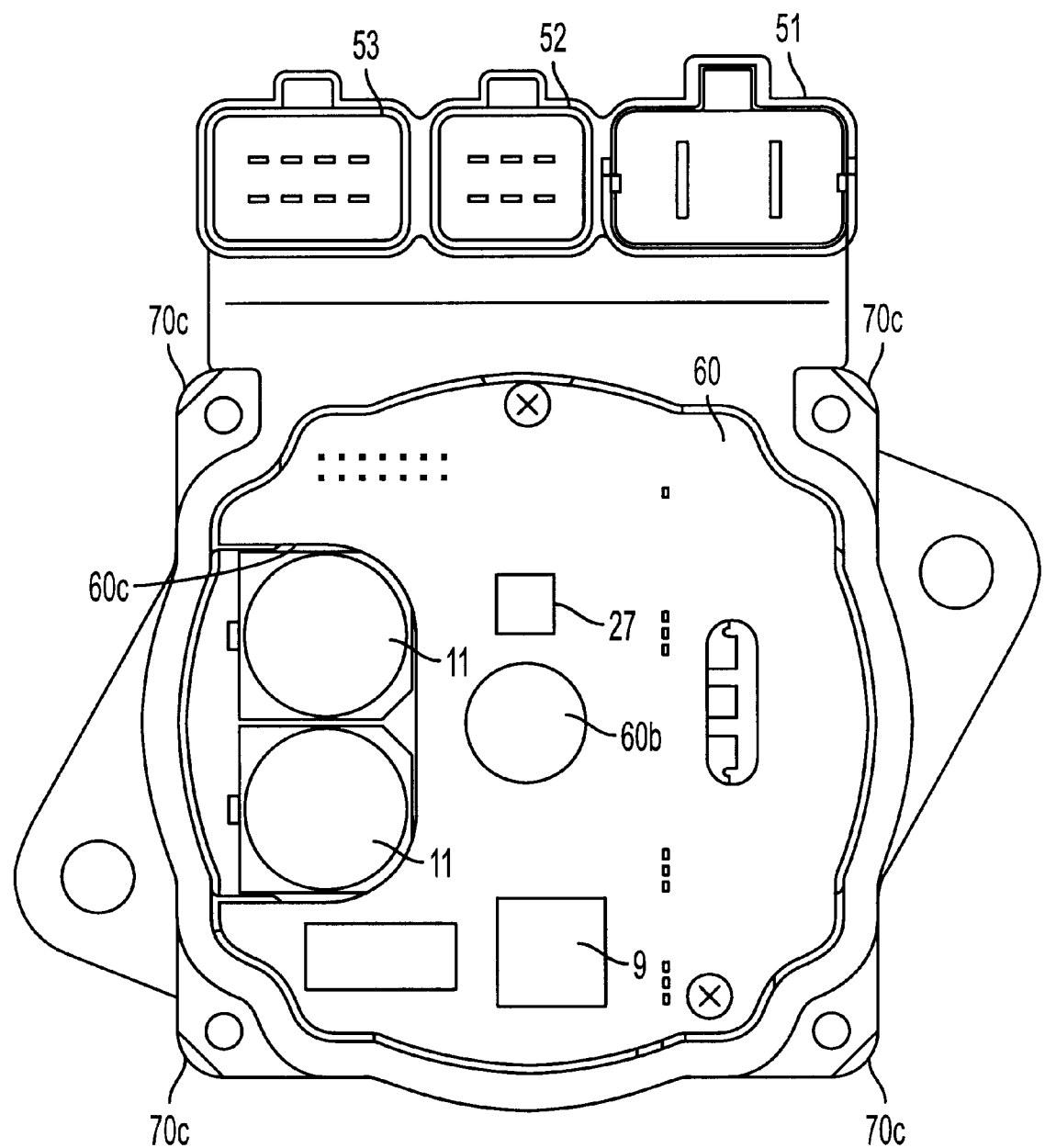
FIG. 4 is a plan view of the control board portion of the electric power steering apparatus shown in FIG. 1.
Figure 5:
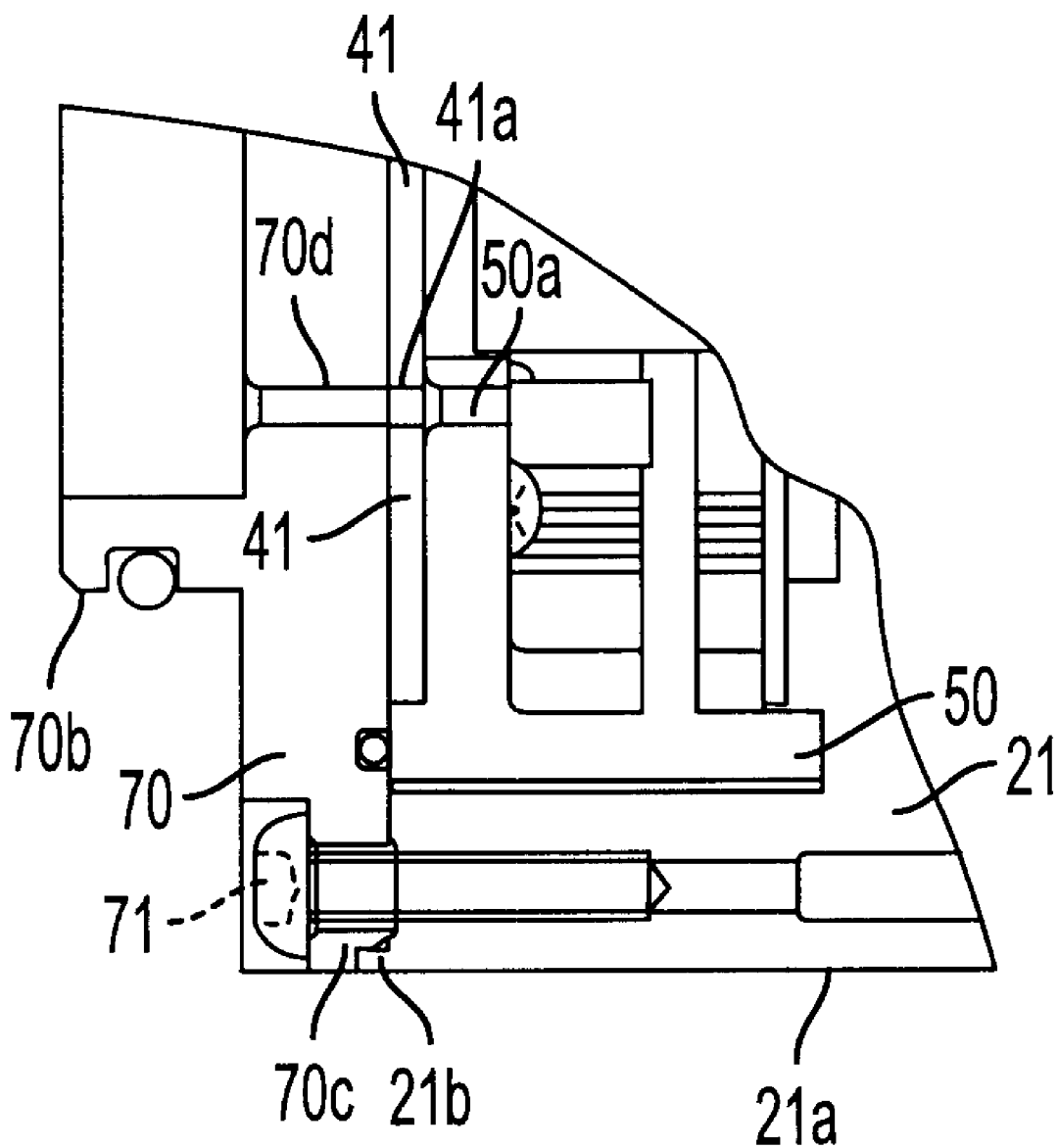
FIG. 5 is a fragmentary cross section of the electric power steering apparatus shown in FIG. 1, showing the manner in which the power steering apparatus is mounted to a heat sink.
Figure 6:
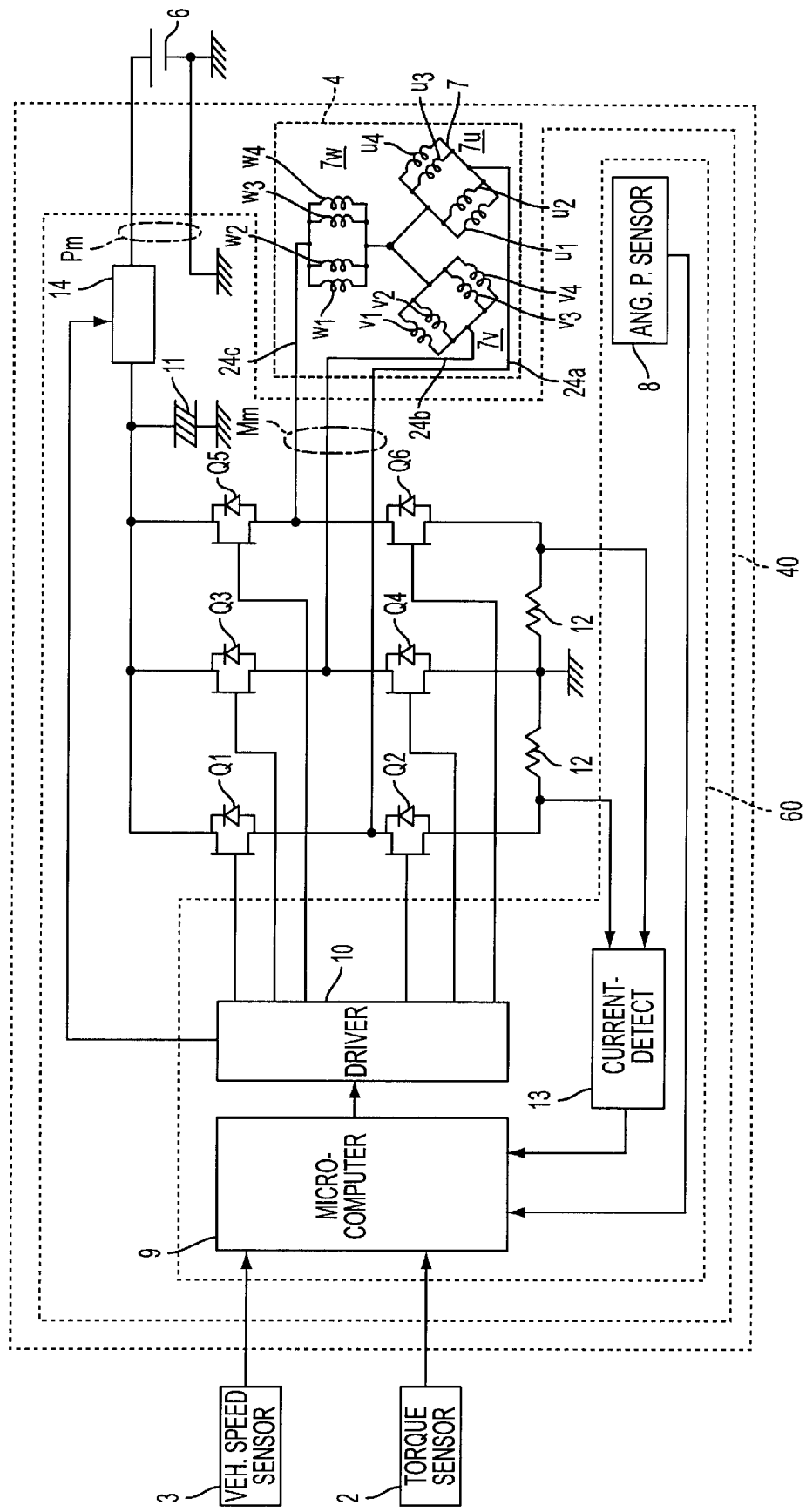
FIG. 6 is a circuit block diagram of the electric power steering apparatus shown in FIG. 1.
Figure 7:
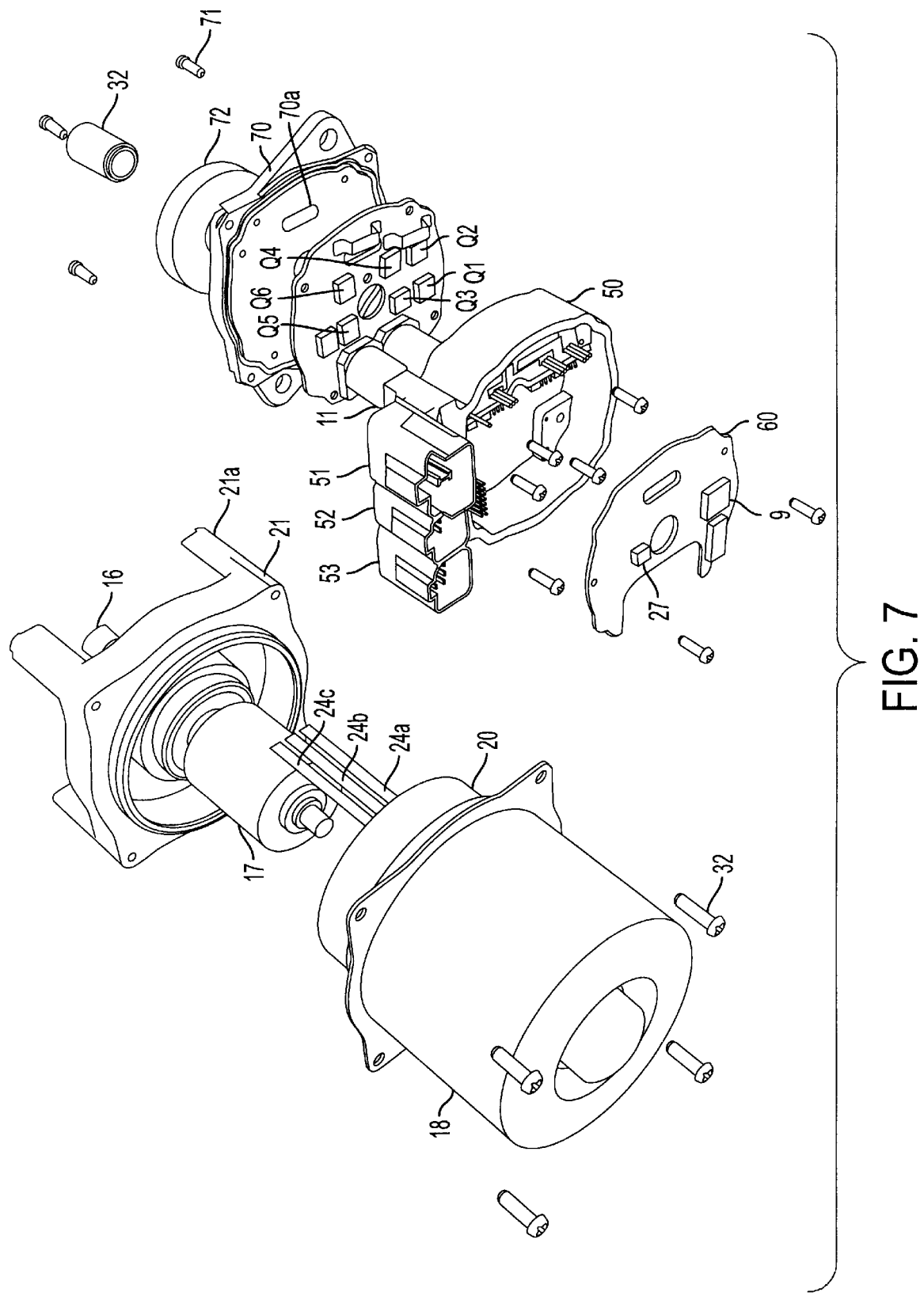
FIG. 7 is an exploded perspective view of the electric power steering apparatus shown in FIG. 1, showing the structure and the manner in which the power steering apparatus is mounted.
Figure 8:
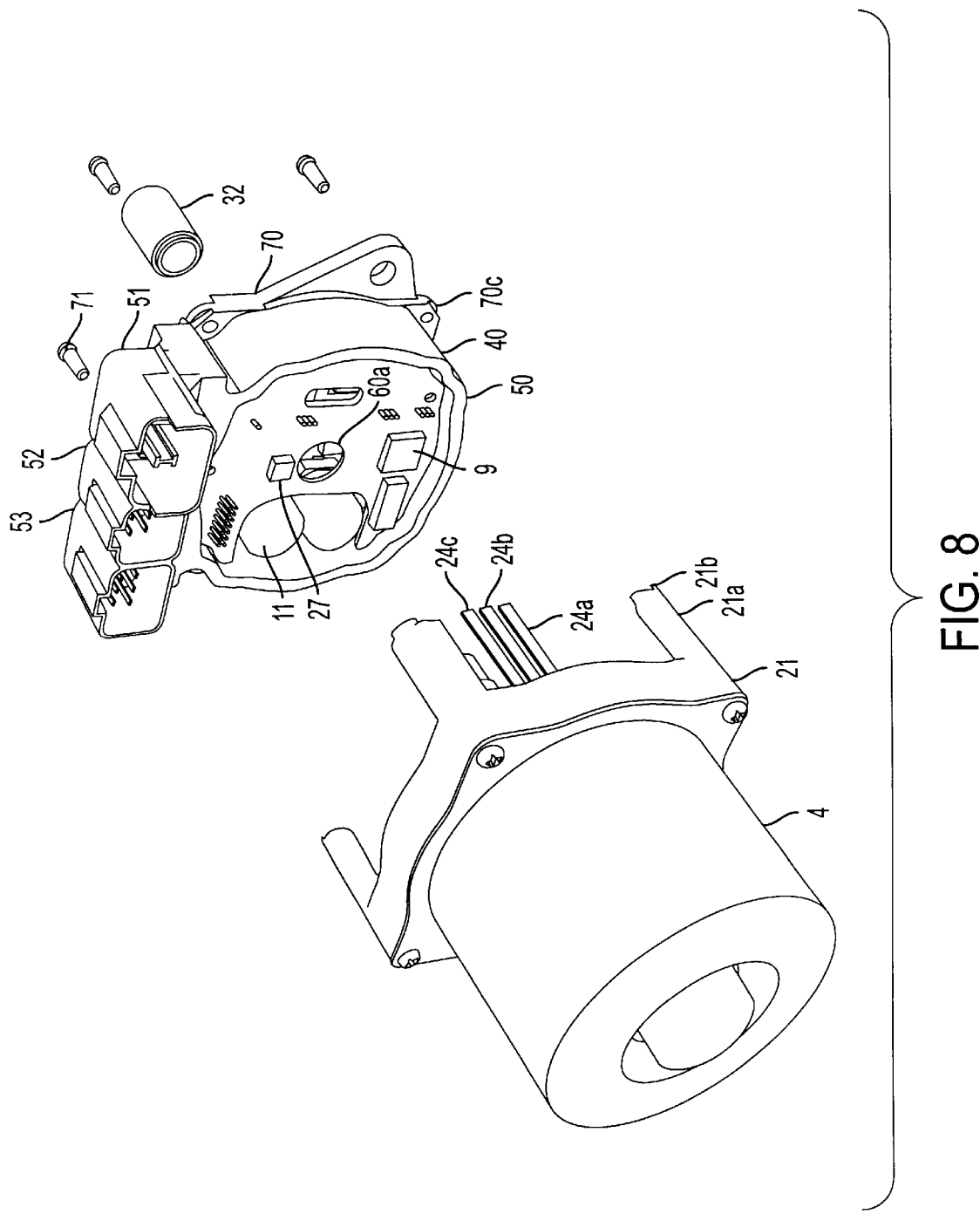
FIG. 8 is another exploded perspective view of the electric power steering apparatus shown in FIG. 1, showing the structure and the manner in which the power steering apparatus is mounted.
Figure 9:
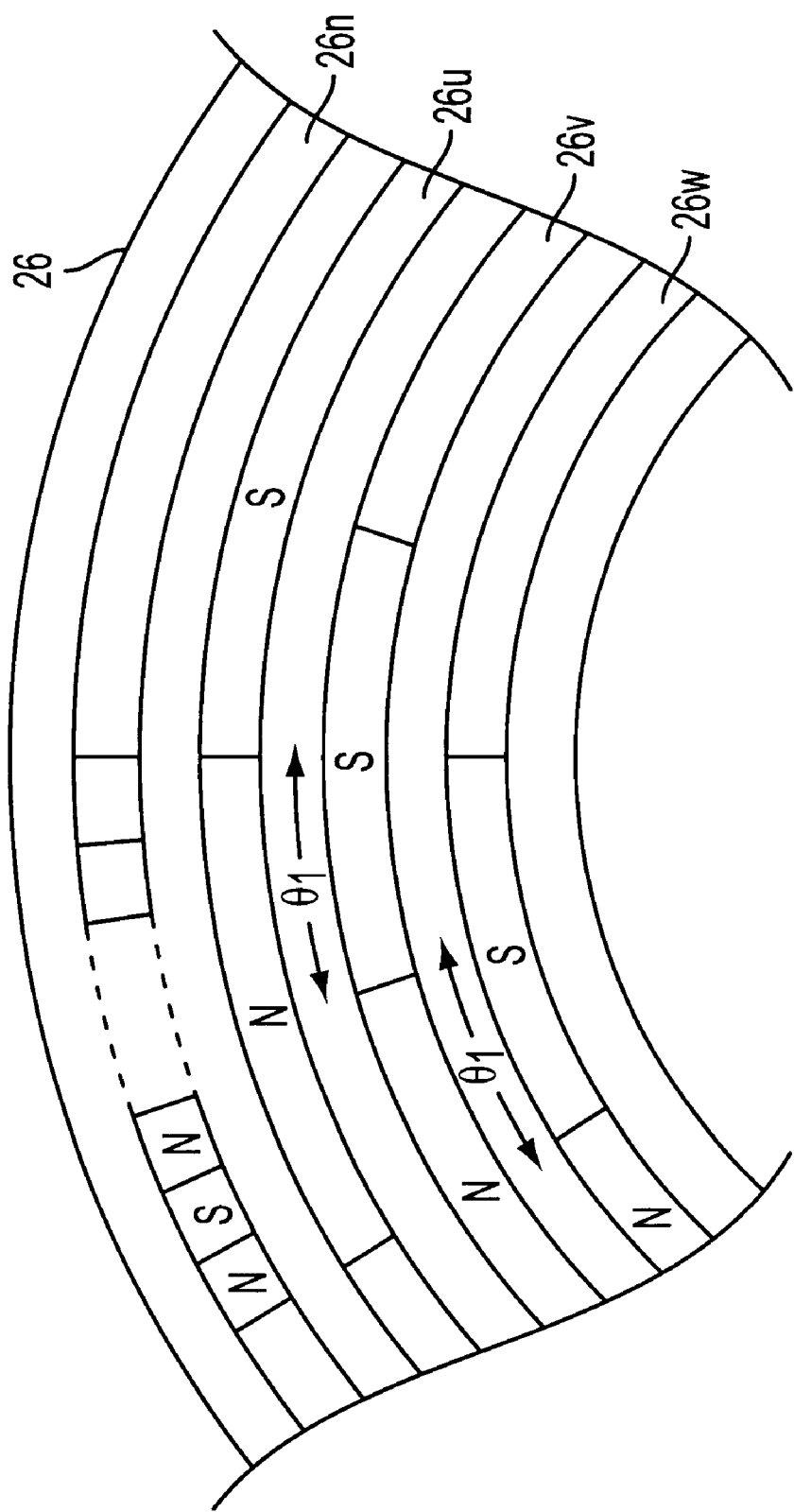
FIG. 9 is a diagram illustrating the magnetization pattern on an angular position sensor of the electric power steering apparatus shown in FIG. 1.

FIGS. 1–10 show the structure of an electric power steering apparatus in accordance with Embodiment 1 of the present invention. FIG. 1 is a cross-sectional view showing the structure of the electric power steering apparatus. FIG. 2 is an enlarged cross section of the motor portion and the control portion shown in FIG. 1. FIG. 3 is a plan view of a power circuit board portion. FIG. 4 is a plan view of a control circuit board portion. FIG. 5 is a fragmentary cross section, showing the manner in which the power steering apparatus is mounted to a heat sink. FIG. 6 is a circuit block diagram of the power steering apparatus. FIGS. 7 and 8 are exploded perspective views of the electric power steering apparatus, showing the structure and the manner in which the power steering apparatus is mounted. FIG. 9 is a diagram illustrating the magnetization pattern on an angular position sensor of the electric power steering apparatus. FIG. 10 is a diagram illustrating the directions of orientations of sensors in a magnetic detecting device included in the electric power steering apparatus. Note that like components are indicated by like reference numerals in various figures including the figures already used to describe the prior art structure.

First, the circuit configuration is described by referring to FIG. 6. An electric motor 4 has a stator around which three-phase armature windings 7 are wound. The armature windings 7 have phases U, V, W each of which has four coils, for example. Thus, 12 magnetic poles are formed in total. This will be described in further detail later. A controller 40 is integral with the motor 4 and includes components mounted on a control circuit board 60 and components mounted on a power circuit board (described later). The components mounted on the control circuit board 60 are an angular position sensor 8, a CPU 9, a driver circuit 10, and a current-detecting means 13. The components mounted on the power circuit board 41 include semiconductor switching elements Q1–Q6 forming a three-phase bridge, a capacitor 11 for removing ripples, a shunt resistor 12, and a switching means 14. The CPU 9 receives the output signals from the torque sensor 2, vehicle speed sensor 3, angular position sensor 8, and other sensors and controls the motor 4. In response to a signal from the CPU 9, the driver circuit 10 supplies a PWM signal to the switching elements Q1–Q6 connected in a three-phase bridge. These operate similarly to their corresponding components of the prior art structure previously described. The positions of terminals (described later) on the circuit are indicated by Pm and Mm.

The structure is described in detail by referring to FIGS. 1–10. In these figures, the three-phase brushless AC motor 4 consists of a rotor 17 and a stator 20. The rotor 17 has an output shaft 16 on which a permanent magnet 15 having eight poles, for example, is mounted. This output shaft 16 acts also as the output of the motor. The stator 20 consists of a yoke 18, magnetic poles 19 (e.g., having 12 salient poles), and armature windings 7 wound around the magnetic poles 19. The magnetic poles 19 are mounted to the yoke 18 with a given space around the outer surface of the rotor 17. The motor 4 has a housing 21 to which the yoke 18 of the stator 20 is mounted via screws 32 (FIG. 7). Bearings 22 for rotatively holding the output shaft 16 are also mounted to the housing 21. The other end of the output shaft 16 is held by bearings 23 mounted in the yoke 18. The winding terminals of the various phases of the star-connected armature windings 7 are connected with motor winding terminals 24a, 24b, and 24c, respectively, as shown in FIGS. 2, 7, and 8. These motor winding terminals 24a, 24b, and 244c extend along the axis of the output shaft 16 toward to a heat sink 70 (described later). The housing 21 has plural support members 21a as shown in FIGS. 5, 7, and 8. The motor 4 is mounted to the heat sink 70 (described later) by these support members 21a. Indicated by 33 is a rubber ring for securing waterproofness.

As best shown in FIG. 2, the angular position sensor 8 comprises a ring 25 mounted to the output shaft 16, a disklike magnet 26 mounted to the ring 25, and a magnetic sensor 27 mounted on the control circuit board 60 as described later. The disklike magnet 26 is made of a ferrite-based magnet and formed integrally with the ring 25. As shown in FIG. 9, one face of the disklike magnet 26 has an outermost magnetic track 26n and three inner magnetic tracks 26u, 26v, 26w. The outermost magnetic track 26n has 256 magnetic poles. These magnetic poles are magnetized alternately south and north circumferentially. Each of the magnetic tracks 26u, 26v, and 26w has eight magnetic poles which are magnetized south and north alternately circumferentially. The magnetic track 26v is magnetized at an angle shifted circumferentially by a given angle of $\theta_1$ with respect to the track 26u. Similarly, the magnetic track 26w is magnetized at an angle shifted circumferentially by a given angle of $\theta_1$ with respect to the track 26v. For example, this angle $\theta_1$ is set to 15 degrees.

A speed-reduction mechanism 35 (as best shown in FIG. 1) comprises a worm gear 29 and a worm wheel 30 mounted in a gear case 28. The worm gear 29 is coupled to the output shaft 16 of the motor 4 by a coupling 31 having a spline. Rotating force of the motor 4 is reduced in speed by the speed-reduction mechanism 35 and transmitted to the worm wheel 30. Thus, torque is transmitted to the steering shaft (not shown).

The heat sink 70 is mounted on the speed reduction mechanism 35. The motor 4 and the heat sink 70 are combined in such a way that the controller 40 is sandwiched between the motor 4 and the heat sink 70. The controller 40 has a metal board 41 acting as a power circuit board, a circuit case body 50 molded from an insulating resin and a control circuit board 60 consisting of an insulative printed board. Plural conducting leads or conductors are insert-molded in the circuit case body 50. The power circuit board 41 and the control circuit board 60 are placed within a plane perpendicular to the axis of the output shaft 16 of the motor 4. The boards 41 and 60 are located opposite to each other along the axis of the output shaft 16. For example, the power circuit board 41 consists of a board commercially available as HITT plate from Denki Kagaku Kogyo Co., Ltd., Japan. The HITT plate comprises an aluminum plate having a thickness of 2 mm and a conductor pattern formed over the aluminum plate via an insulating layer having a thickness of 80 $\mu$m. The conductor pattern is made of copper and has a thickness of 100 $\mu$m. The aluminum plate disposed on rear surface of this power circuit board 41 is intimately mounted onto the heat sink 70 to increase the dissipation of heat. As best shown in FIG. 3, the semiconductor switching elements Q1–Q6 forming abridge circuit, the capacitor 11 for removing ripple currents, the shunt resistor 12, and other components handling large currents are solder-mounted onto the conductor pattern on the power circuit board 41. The large capacitor 11 is located on a peripheral portion of the power circuit board 41. The conductor pattern formed on the power circuit board 41 has a sufficient cross section to cope with large currents. Circuit components corresponding to large currents flowing through the motor 4 can be mounted on the conductor pattern.

As shown in FIG. 3, a power-supply connector 51, a connector 52 for the torque sensor, and a vehicle signal connector 53 are integrally molded with a side surface of the circuit case body 50. This case body 50 is mounted on the heat sink 70 to cover the power circuit board 41. The control circuit board 60 is mounted at the end of the circuit case body 50 that faces away from the power circuit board 41. The conducting leads or conductors that are insert-molded in the circuit case body 50 are exposed at requisite locations on surfaces within the circuit case body 50 to form connector terminals Cm for connection of the power circuit board 41 and the control circuit board 60, power-supply terminals Pm on the side of the power circuit board 41, and motor terminals Mm (hereinafter often referred to as the motor terminal) for the motor, as shown in FIG. 3. Ends of the connector terminals Cm, power-supply terminals Pm, and motor terminals Mm are arranged substantially in a line around the center of the circuit case body 50 and soldered to the conductor pattern on the power circuit board 41.

The ends of the motor terminals Mm that face away from the end joined to the power circuit board 41 extend into a connection hole 70a formed in the heat sink 70 as shown in FIG. 2, and are joined to motor winding terminals 24a–24c brought out from the motor 4. The ends of the connector terminals Cm on the side of the control circuit board 60 are inserted in through-holes formed in the control circuit board 60 and solder-mounted during mounting of the control circuit board 60. The ends of the power-supply terminals Pm on the opposite side of the power circuit board 41 extend to the power-supply connector 51. In an intermediate location, a terminal connected with the control circuit board 60 branches from this end and soldered to the control circuit board 60 in the same way as the connector terminals Cm. The circuit case body 50 is fixedly mounted to the power circuit board 41 with screws 43. The power circuit board 41 is held between screws 44 to hold the circuit case body 50 and the power circuit board 41 to the heat sink 70. A rubber ring 45 is used to waterproof the circuit case body 50 and the heat sink 70.

One ends of the leads are connected to the torque signal connector 52 and vehicle signal connector 53. Other ends of these leads forming terminals are soldered to the control circuit board 60 in the same way as the connector terminals Cm. Thus, various components mounted on the control circuit board 60 and on the power circuit board 41 are electrically connected with the battery 6, the torque sensor 2, the vehicle speed sensor 3, and other sensors via connectors. These power-supply connector 51, the connector 52 for the torque sensor, and the vehicle signal connector 53 are juxtaposed. External leads are attached to and detached from the corresponding connectors axially of the output shaft 16 of the motor 4 in such a way that attachment and detachment are possible on the outside of the motor 4. The connector 52 for the torque sensor is located in the center between the connector 52 and 51.

Figure 10B:
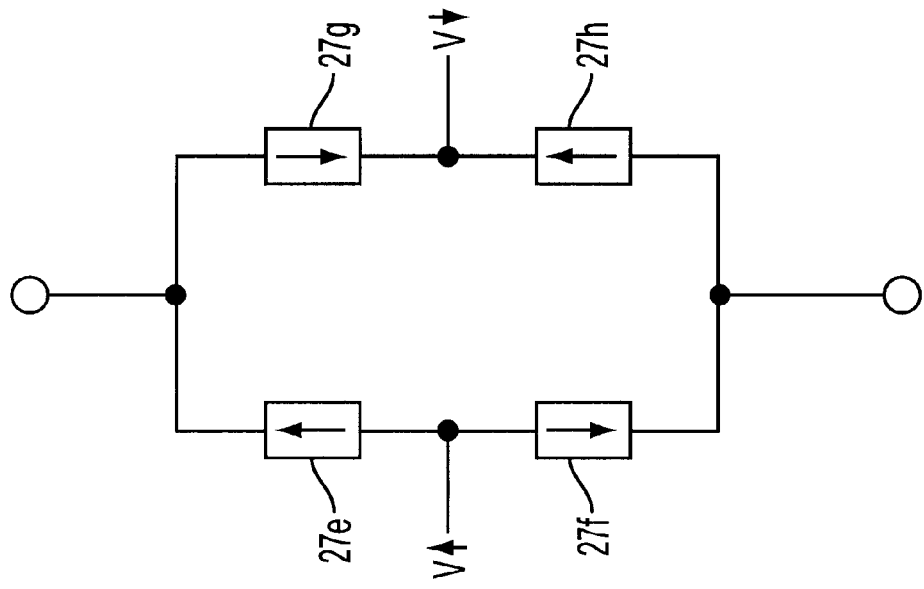
FIG. 10 is a diagram illustrating the directions of orientations of sensors in a magnetic detecting device included in the electric power steering apparatus shown in FIG. 1.
Figure 10A:
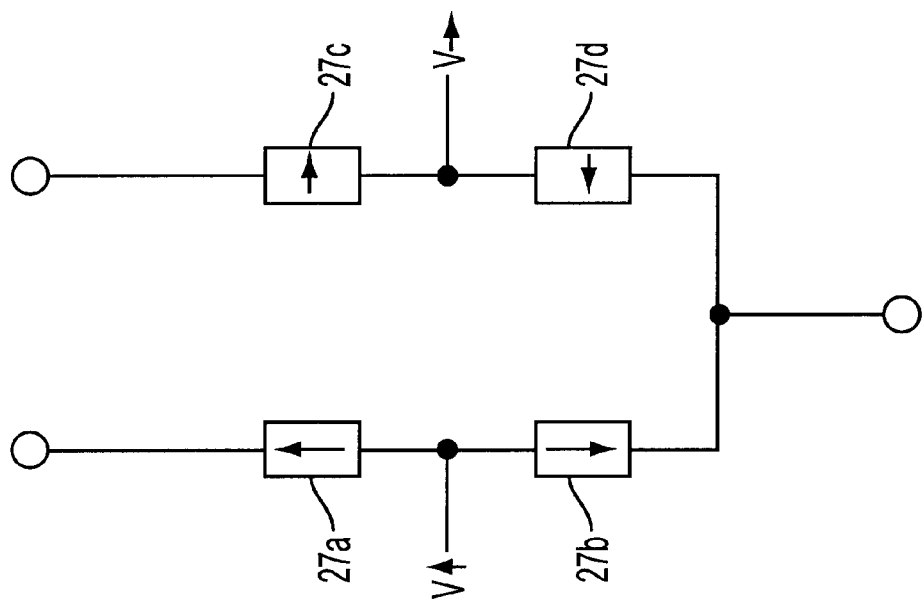

As shown in FIG. 4, the general circuit parts generating little heat are disposed on the control circuit board 60. The general circuit parts include the CPU 9, the current-detecting means 13, peripheral circuit elements handling small amounts of current, and the magnetic sensor 27 are solder-mounted onto the conductor pattern on the control circuit board 60. A steering torque signal and a vehicle speed signal are applied from the torque sensor 2 and the vehicle speed sensor 3, respectively, to the CPU 9 via the connector 52 for the torque sensor and via the vehicle signal connector 53, respectively. As shown in FIG. 10, the magnetic sensor 27 consists of magnetoresistors located opposite to the magnetic tracks 26n, 26u, 26v, and 26w, respectively. The giant magnetoresistor positioned opposite to the magnetic track 26n consists of two mutually perpendicular half-bridges made up of four elements 27a–27d shown in FIG. 10(a). Each of the giant magnetoresistors opposite to the magnetic tracks 26u, 26v, and 27w, respectively, is made of one full bridge consisting of four elements 27e–27h shown in FIG. 10(b). In the figures, the arrows indicate the directions of internal magnetizations. The control circuit board 60 is provided with a cutout portion 60c at the position where the capacitor 11 on the power circuit board 41 overlaps the control circuit board in the axial direction of the output shaft 16.

The heat sink 70 has a fitting protruding portion 70b fitted into a fitting hole 28a in a gear case 28. A rubber ring 46 is inserted between the circuit case body 50 and the housing 21. The housing 21 is mounted to the heat sink 70 by the support members 21a, so that the circuit case body 50 is sandwiched between the housing 21 and the heat sink 70. Consequently, intrusion of water is prevented. As shown in FIG. 5, a fitting surface 21b formed at the end surface of each support member 21a and a fitting surface 70c formed on the heat sink 70 are fitted together to thereby form a positioning mechanism for assuring that the fitting protruding portion 70b of the heat sink 70 is coaxial with the output shaft 16 of the motor 4. The connection hole 70a in which the motor winding terminals 24a–24c are connected with the motor terminals Mm is located on the inner side of the fitting protruding portion 70b. Screws 71 fixedly mount the support members 21a of the housing 21 to the heat sink 70. A cover 72 protects the junctions of each of the motor winding terminals 24a–24c and the motor terminals Mm.

As shown in FIG. 5, the power circuit board 41, the circuit case body 50, and the heat sink 70 are provided with positioning holes 41a, 50a, and 70d, respectively, to place these components in position. As shown in FIG. 1, the heat sink 70, the power circuit board 41, and the control circuit board 60 are provided with output shaft holes 70e, 41b, and 60b, respectively, to permit passage of the output shaft 16 of the motor 4. The output shaft hole 70e in the heat sink 70 and the output shaft hole 41b in the power circuit board 41 are larger in diameter than the output shaft 60b in the control circuit board 60.

The electric power steering apparatus in accordance with Embodiment 1 configured as described thus far is assembled in the following procedures. The motor 4 and the controller 40 are assembled in separate assembly operations. The motor 4 is assembled in the manner described now. The permanent magnet 15 is adhesively bonded to the output shaft 16 and then magnetized into eight poles. The bearings 23 are mounted with a press fit, thus completing the rotor 17. With respect to the stator 20, the armature windings 7 of phases U, V, and W are wound on 12 magnetic poles 19 via an insulator with a spacing of an electrical angle of 120 degrees to form 12 windings U1–U4, V1–V4, and W1–W4. The starting ends of the windings U1–U4 are connected with their respective terminal ends to form a U-phase armature winding 7u. Similarly, motor windings 7v and 7w of phases V and W, respectively, are formed. The terminal ends of all the phases are connected to form a neutral point. The starting ends of the phases are connected with the motor winding terminals 24a–24c, respectively. The stator 20 is mounted with a press fit into the yoke 18.

Then, the bearings 22 are mounted to the housing 21. Subsequently, the output shaft 16 of the rotor 17 is mounted with a press fit into the bearing 22. The ring 25 made integral with the disklike magnet 26 is mounted with a press fit from the opposite side to the rotor 17. At this time, the angular relation between the permanent magnet 15 and the disklike magnet 26 are determined using a jig. Then, the rubber ring 33 is inserted into the housing 21. The yoke 18 having the stator 20 mounted with a press fit therein is inserted and fixed with the screws 32. A testing magnetic sensor is placed at the same position as the magnetic sensor 27 on the control circuit board 60. The characteristics of the motor 4 assembled in this way are examined to check its performance.

Assembly of the controller 40 is started with placing the CPU 9, peripheral circuit elements, etc. on the control circuit board 60 having its electrodes already applied with cream solder. The control circuit board 60 is heated from below by a reflow furnace or the whole ambient is heated to solder the components. Similarly, the semiconductor switching elements Q1–Q6, the shunt resistor 12, the capacitor 11, and other parts are placed on the power circuit board 41 having its electrodes already applied with cream solder. Positioning pins of an assembly jig are passed into the positioning holes 41a and 50a, and the boards are placed in position. Under this condition, the circuit case body 50 is placed to cover the power circuit board 41. The case body 50 is fixed with the screws 43. The components are solder-mounted by the reflow furnace. Then, the rubber ring 45 is placed into a groove in the heat sink 70. The positioning holes 41a, 50a, and 70d are placed in position by positioning pins of the assembly jig. Under this condition, the power circuit board 41 on which the circuit case body 50 has been mounted is fixedly mounted to the heat sink 70 with the screws 44.

Then, the control circuit board 60 is mounted to the circuit case body 50. The contour of the fitting protruding portion 70b of the heat sink 70 is made coaxial with the output shaft hole 60b in the control circuit board 60 with an assembly jig. The connector terminals Cm of the circuit case 50, the power-supply terminals Pm, the conductor terminals connected to the torque sensor connector 52, and the conductor terminals connected to the vehicle signal connector 53 are inserted into through-holes in the control circuit board 60. The terminals are connected by robot soldering or partial overflow soldering. At this time, the positioning jig does not interfere with the output shafts 40e or 41b, because the output shaft hole 70e in the heat sink 70 and the output shaft hole 41b in the power circuit board 41 are larger in diameter than the output shaft hole 60b in the control circuit board 60. A characteristic test is performed on the controller 40 assembled in this way to check its performance.

The circuit case body 50 is inserted on the inner side of the support members 21a mounted on the housing 21. The motor 4 and the controller 40 assembled separately in this way are placed in position with the fitting surfaces 21b and 70c formed on the support members 21a and the heat sink 70, respectively. Then, they are securely fixed with screws 71. Thereafter, the motor winding terminals 24a–24c brought out through the connection hole 70a in the heat sink 70 are welded to the motor terminal Mm. The resulting joints are located on the inner side of the fitting protruding portion 70b of the heat sink 70 and so this joints are protected by inserting the cover 72 into the inner side of the fitting protruding portion 70b.

As described thus far, in the electric power steering apparatus in accordance with Embodiment 1 of the present invention, only components handling small amounts of current such as the CPU 9 and its peripheral devices are mounted on the control circuit board 60. Therefore, it is not necessary to increase the width or thickness of the conductor pattern on the control circuit board 60. This enables higher-density packaging of components and miniaturization of boards or substrates. Furthermore, the semiconductor switching elements Q1–Q6, the shunt resistor 12, the capacitor 11, and other components consuming large amounts of current are packed on the power circuit board 41, which in turn is in intimate contact with the heat sink 70. Since the heat sink 70 is mounted to the gear case 28 of the speed-reduction mechanism 35, heat generated by the components consuming large amounts of current and by the conductor pattern is transmitted to the heat sink 70 and to the gear case 28 via the power circuit board 41. The heat is dissipated to the outside air from the heat sink 70 and from the gear case 28. Therefore, if the power circuit board 41 is reduced in size, temperature elevation can be suppressed. Furthermore, neither the heatproofness of the conductor pattern nor the durability is spoiled.

Moreover, the motor 4 is mounted to the heat sink 70 via the support members 21a, and the heat sink 70 is mounted to the gear case 28. Therefore, heat generated by the armature windings 7 is dissipated to the outside air via the yoke 18. In addition, the heat is effectively transmitted to the heat sink 70 and to the gear case 28 via the support members 21a. Consequently, if the motor 4 and the controller 40 are integrated, heat transfer to the controller 40 is suppressed. Temperature rise in the whole electric power steering apparatus can be suppressed. Also, the output power of the motor 4 can be increased without deteriorating the heatproofness or the durability of the controller 40.

Additionally, the connection length is shortened, because the power circuit board 41 is connected with the armature windings 7 by the motor terminals Mm and the motor winding terminals 24a–24c. Therefore, power loss can be reduced. Additionally, radiation noise can be suppressed. Furthermore, the motor 4 and the controller 40 are separately assembled and tested for performance. In consequence, the productivity and reliability can be enhanced. Moreover, the power steering apparatus can be assembled using equipment heretofore used for the conventional system in which the motor 4 and the controller 40 are separate from each other. Production can be effected without adding new equipment.

Moreover, since the fitting surface 21b formed at the end surface of each support member 21a and the fitting surface 70c formed on the heat sink 70 are fitted together, it is assured that the fitting protruding portion 70b of the heat sink 70 is coaxial with the output shaft 16 of the motor 4. In addition, it is assured that the worm gear 29 of the speed-reduction mechanism 35 is coaxial with the output shaft of the motor. Hence, rotation of the motor 4 is transmitted smoothly to the worm gear 29. As such, noise and vibrations can be reduced.

Additionally, the power-supply connector 51, the connector 52 for the torque sensor, and the vehicle signal connector 53 are lined up and can be inserted and withdrawn axially of the output shaft 16 of the motor 4 on the opposite side of the speed-reduction mechanism 35. The connector 52 for the torque sensor is located in the center. Therefore, where a steering module previously fitted with this electric power steering apparatus and including a rack-and-pinion is installed in a vehicle, the insertability of the connectors for the wires on the side of the vehicle can be improved. Additionally, the wires on the vehicle side can be placed to face toward the rear of the motor 4. The space on the vehicle side occupied by the wires can be reduced. Connection to the connector 52 for the torque sensor is made after the steering module has been completed.

The motor winding terminals 24a–24c protruding into the connection holes 70a in the heat sink 70 are welded to the motor terminal Mm and thus electrically connected. Since these electrical junctions are located on the inner side of the fitting protruding portion 70b of the heat sink 70, the apparatus can be protected from intrusion of foreign materials and electrical shorts by mounting the cover 72 on the inner side of the fitting protruding portion 70b. Because the output shaft hole 70e in the heat sink 70 and the output shaft hole 41b in the power circuit board 41 are set larger than the output shaft hole 60b in the control board 60, a positioning jig does not interfere with the output shaft hole 70e or 41b. Consequently, deformation of the heat sink 70 and the power circuit board 41 and solder cracks can be prevented. The capacitor 11 is positioned on a peripheral portion of the power circuit board 41. The control circuit board 60 is provided with the cutout portion 60c at the position where the capacitor 11 overlaps the board in the axial direction of the output shaft 16. The board 60 can be mounted with a decreased axial distance to the power circuit board 41. As a result, miniaturization can be accomplished.

Furthermore, the magnetic sensor 27 is packed on the control circuit board 60 and so wire leads and connectors that would normally be used to connect the magnetic sensor 27 and the control circuit board 60 are dispensed with. Hence, malfunction due to external noise received during wiring operation is also suppressed. In the above embodiment, the permanent magnet 15 has 8 poles and the stator 20 has 12 magnetic poles. The invention is not limited to this combination of the numbers of poles. Other combinations of numbers of poles are also possible. To mount the power steering system in the engine compartment, the rubber rings 42, 75, and 76 are inserted for waterproofness. It may also be installed in the passenger compartment. In this case, the rubber rings 42, 75, and 76 can be omitted.

In the above embodiment, the power circuit board is made of the aluminum board 41. It may also be made of other metal board having high thermal conductivity such as copper. Furthermore, a ceramic board may be employed. The torque sensor connector 52 is inserted and withdrawn axially of the motor 4 on the side of the motor 4. The torque sensor may be inserted and withdrawn radially of the motor 4, toward and away from the speed-reduction mechanism 35, or in an intermediate direction between them. The magnetic sensor 27 is made of giant magnetoresistors. The magnetic sensor is not limited to such giant magnetoresistors. Other magnetic sensors such as magnetic resistors, Hall devices, or Hall ICs can also be used. Furthermore, in the above embodiment, a combination of the magnetized disk surface of the disklike magnet 26 and surface-mounted giant magnetoresistors is used. A combination of the magnetized outer surface of the disklike magnet 26 and reading-type giant magnetoresistors may also be exploited.

Embodiment 2

Figure 11A:
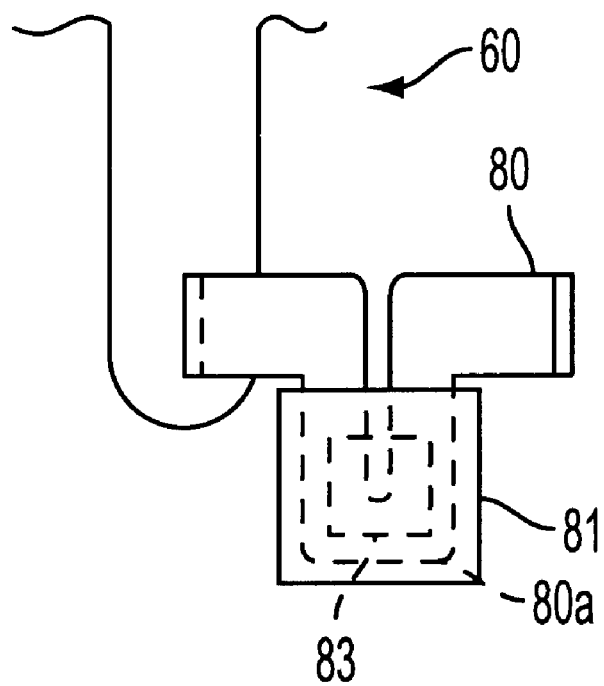
FIG. 11 is a side elevation of the current-detecting portion of an electric power steering apparatus in accordance with Embodiment 2 of the invention.
Figure 11B:
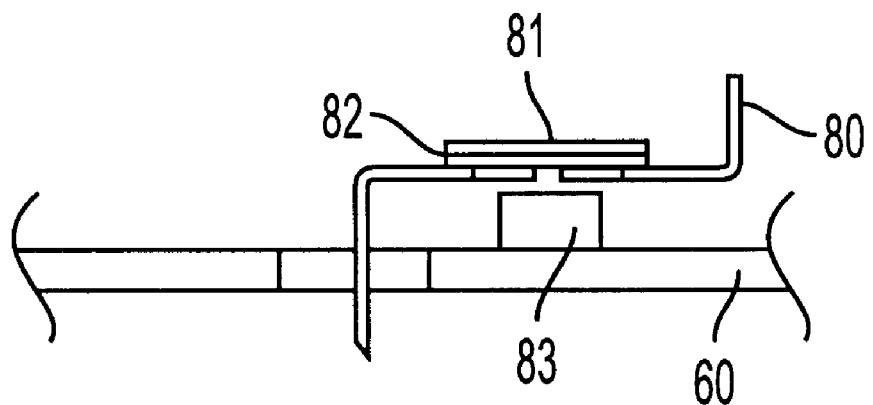

FIGS. 11(a) and 11(b) show the current-detecting portion of an electric power steering apparatus in accordance with Embodiment 2 of the invention. FIG. 11(a) is a plan view of the power steering apparatus. FIG. 11(b) is a cross-sectional view of the power steering apparatus. In these figures, a motor winding terminal 80 is connected with the armature winding 7 and extends to a heat sink (not shown). This motor winding terminal 80 is cranked near the control circuit board 60 and has a U-shaped portion 80a parallel to the control circuit board 60. A magnetic collector 81 made of Permalloy that is a ferromagnetic material is firmly mounted to this U-shaped portion 80a via an insulator 82. A Hall device 83 is solder-mounted onto the control circuit board 60 such that the magnetic-detecting portion of the device is in the center of the space inside the U-shaped portion.

When an electrical current flows through the motor winding terminal 80, a magnetic field is developed around it. The U-shaped portion 80a acts as a coil of a half turn. The magnetic flux density in the center of the U-shaped portion 80a increases. The magnetic collector 81 collects the leaking magnetic flux, thus increasing the magnetic flux through the Hall device. Because the magnetic flux density through the Hall device is in proportion to the current, the Hall device 83 generates an electromotive force proportional to the current through the motor 4.

In this way, in the electric power steering apparatus in accordance with Embodiment 2 of the present invention, an electromotive force proportional to the current flowing through the motor winding terminal 80 is produced in the Hall device 83. This electromotive force is amplified by an amplifier provided on the control board 60. Consequently, the current flowing through the armature winding 7 of the motor 4 can be detected in a noncontacting manner. The assisting torque can be controlled by providing a feedback of this current. Furthermore, the motor winding terminal 80 can be bent at its intermediate position and so the cost can be curtailed. The current-detecting portion consisting of the Hall device 83 is placed on the control circuit board 60. The space occupied by the wiring can be reduced compared with the case in which the current-detecting portion is placed in other portions. In this embodiment, the magnetic collector 81 is made of Permalloy. It may also be made of a ferromagnetic material such as flat roller magnetic steel sheet or ferrite core.

Embodiment 3

Figure 12A:
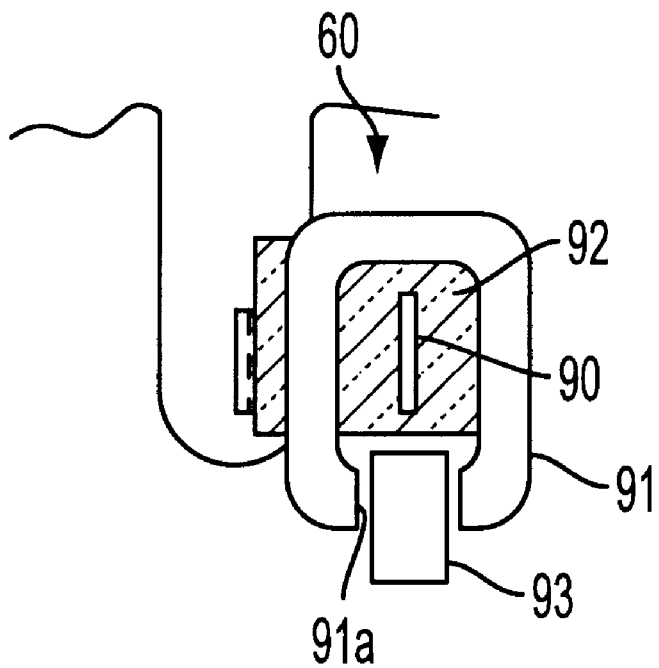
FIG. 12 is a side elevation of the current-detecting portion of an electric power steering apparatus in accordance with Embodiment 3 of the invention.
Figure 12B:
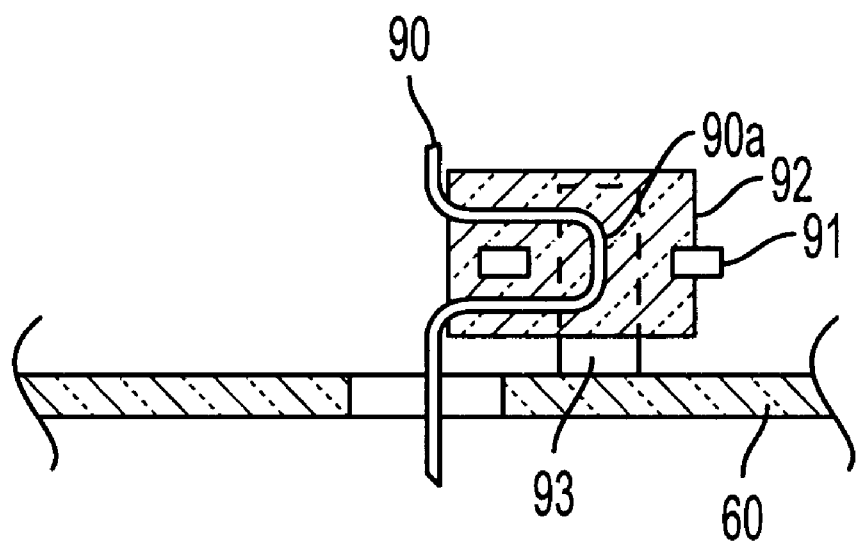
Figure 13A:
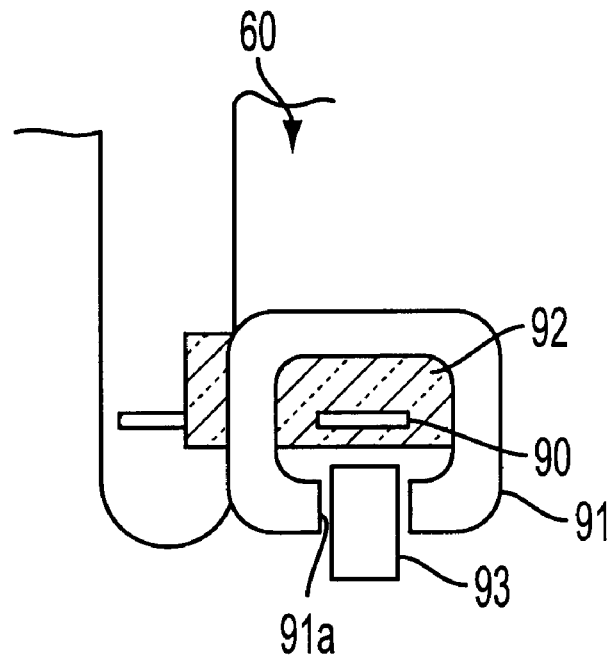
FIG. 13 is another side elevation of the current-detecting portion of an electric power steering apparatus in accordance with Embodiment 3 of the invention.
Figure 13B:
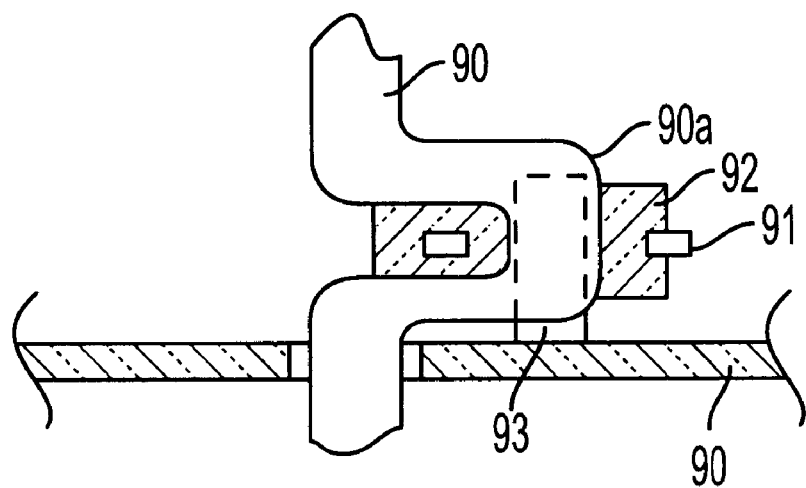
Figure 14:
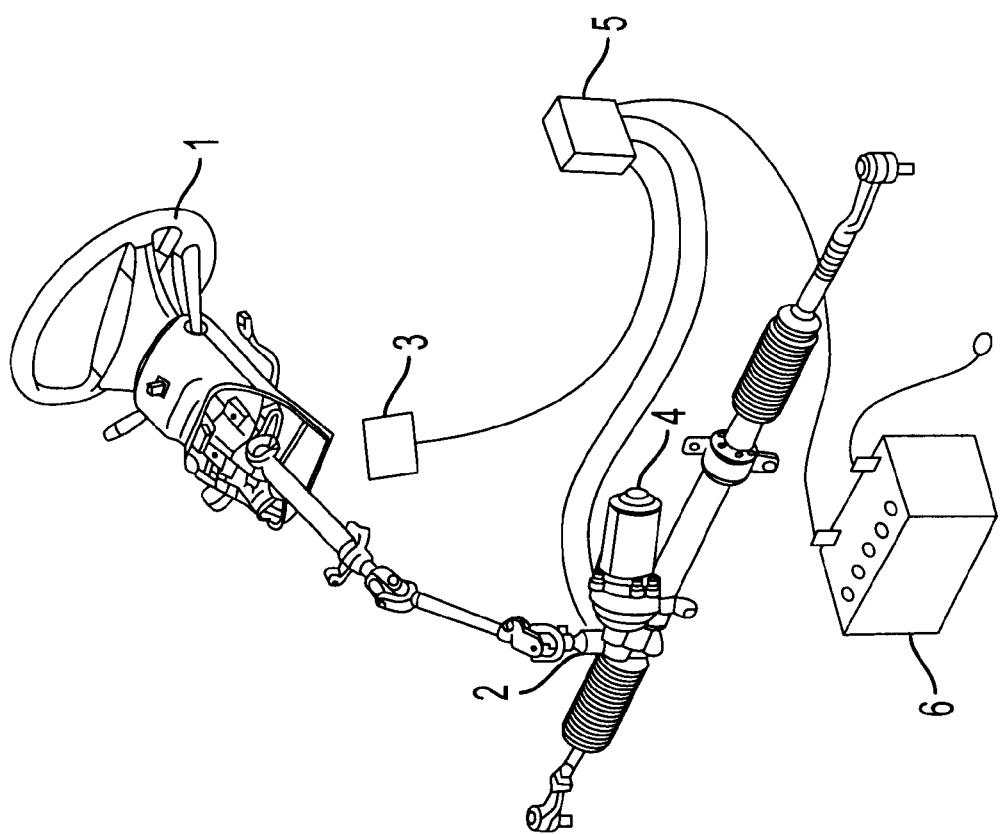
FIG. 14 is a perspective view of the prior art electric power steering apparatus.
Figure 15:
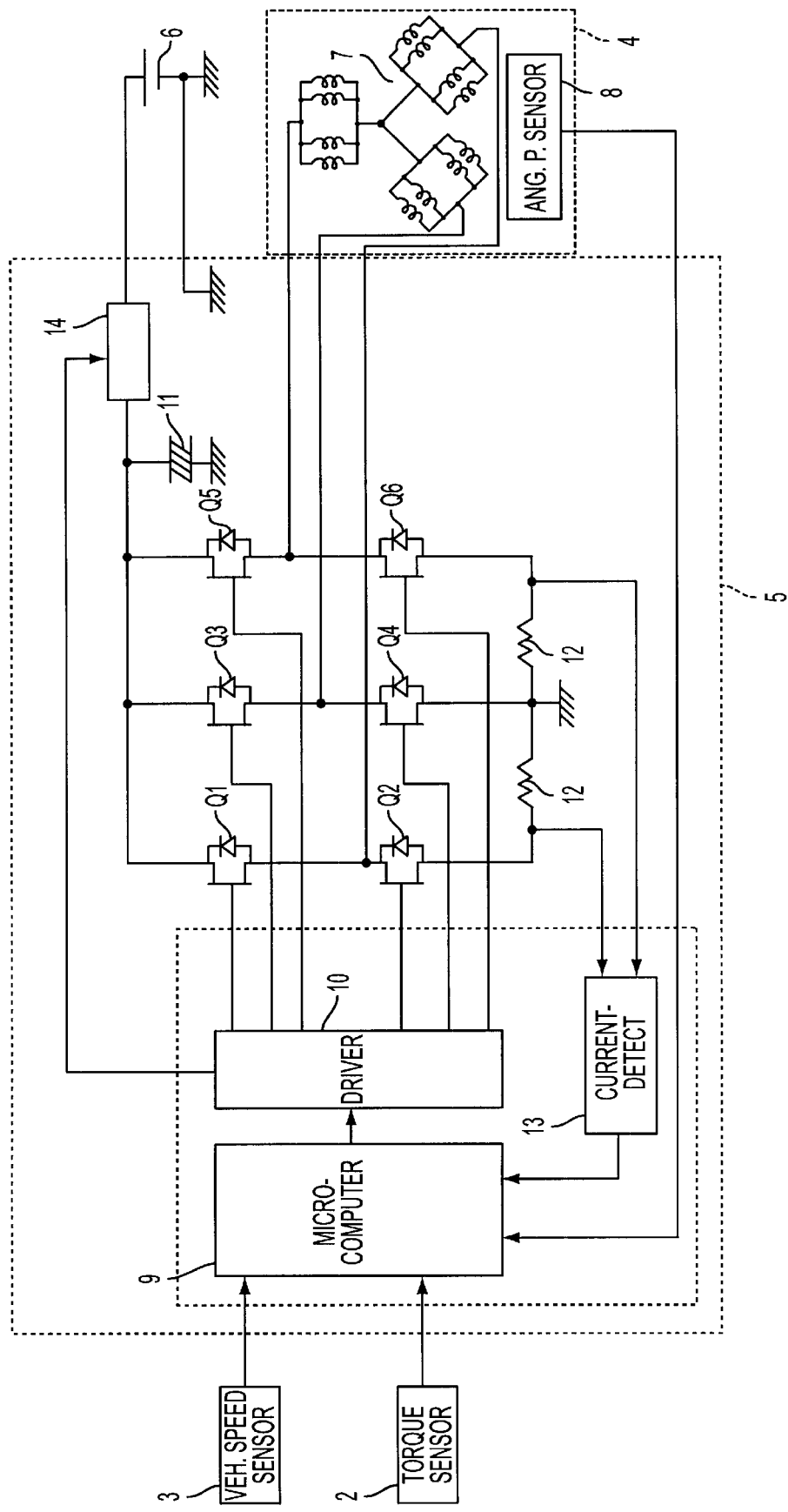
FIG. 15 is a circuit block diagram of the prior art electric power steering apparatus.

FIGS. 12 and 13 are cross sections of the current-detecting portion of an electric power steering apparatus in accordance with Embodiment 3 of the present invention. In FIG. 12, a winding terminal 90 is wound around an armature winding 7 and bent close to the control circuit board 60 to form a U-shaped portion 90a. A C-shaped magnetic collector 91 of ferrite core is integrally molded from an insulating resin 92 such that the U-shaped portion 90a is sandwiched between two opposite portions of this collector 91. A Hall device 93 is mounted on the control circuit board 60 such that its magnetic detecting portion is located within the opening 91a formed between the both opening ends of the magnetic collector 91. It follows that the U-shaped portion 90a makes a half revolution around the magnetic collector 91. An electrical current flows through the winding terminal 90, causing the magnetic collector 91 to produce a magnetic field. An electromotive force proportional to the magnetic field developed by the magnetic collector 91 is induced in the Hall device 93 located in the opening 91a of the ferrite core 91.

As described thus far, in the electric power steering apparatus in accordance with Embodiment 3 of the invention, an electromotive force proportional to the current flowing through the winding terminal 90 is produced in the Hall device 93 and so the current flowing through the armature winding 7 of the motor 4 can be detected in a noncontacting manner by amplifying the electromotive force by the amplifier installed on the control circuit board 60. The assisting torque can be controlled by providing a feedback of this current. Furthermore, the current-detecting portion made of the Hall device 93 is located on the control circuit board 60, thus reducing the space occupied by wiring compared with the case in which the current-detecting portion is positioned in other portions. Although the magnetic collector 91 is made of ferrite core, it may also be made of a ferromagnetic material such as Permalloy or flat rolled magnetic steel sheet. In addition, the winding terminal 90 is not limited to the form described above. As shown in FIG. 13, the U-shaped portion 90a of the winding terminal 90 may be stamped from sheet metal.

What is claimed is:

1. An electric power steering apparatus comprising:
   an electric motor having an output shaft;
   a speed-reduction mechanism for reducing rotational speed of said output shaft of said motor;
   a discrete power circuit board having power circuit parts mounted thereon, said power circuit parts including semiconductor switching elements for supplying electric power to said electric motor;
   a discrete control circuit board having general circuit parts generating little heat, said general circuit parts including a microcomputer for controlling said semiconductor switching elements according to an output signal from a torque sensor for measuring steering torque and according to an output signal from a vehicle speed sensor for measuring vehicle speed;
   a circuit case body made of an insulating material including an insert-molded wiring conductors and having a first connector adapted to connect with said torque sensor, a second connector adapted to connect said vehicle speed sensor and a third connector adapted to receive an electric power supplied from outside, said first, second and third connectors are integrally molded with said circuit case body;
   a heat sink for dissipating heat from said power circuit parts on said discrete power circuit board, said heat sink being mounted to said speed-reduction mechanism; and
   a controller formed by said discrete power circuit board, said discrete control circuit board and said circuit case body;
   wherein said discrete power circuit board and said discrete control circuit board are located opposite to each other along the axis of said output shaft of said electric motor within said circuit case body of said controller; and
   said electric motor and said heat sink are combined in such a way that said controller is sandwiched between said electric motor and said heat sink.

2. The electric power steering apparatus of claim 1, wherein said heat sink and said speed-reduction mechanism have their respective fitting portions fitted together and mounted coaxially, and wherein said electric motor and said heat sink are combined coaxially.

3. The electric power steering apparatus of claim 1, wherein
   (A) said first, second and third connectors are arranged in a line substantially perpendicularly to the axis of said electric motor,
   (B) said first connector is located between said second and third connectors, and
   (C) external leads to be connected with said second and third connectors, respectively, are connected in a direction substantially parallel to the axis of said output shaft of said electric motor at outside of said electric motor.

4. The electric power steering apparatus of claim 1, wherein said heat sink, said power circuit board, and said control circuit board are provided with shaft holes through which said output shaft of said electric motor passes, and wherein the shaft holes in said heat sink and in said power circuit board are set larger in diameter than the shaft hole in said control circuit board.

5. The electric power steering apparatus of claim 1, wherein the electric power steering apparatus further comprises an angular position sensor to measure the angular position of said electric motor, said angular position sensor includes;
  (A) a permanent magnet magnetized into multiple poles mounted on said output shaft of said electric motor, and
  (B) a magnetic detecting device disposed on said control circuit board.

6. The electric power steering apparatus of claim 1, wherein a capacitor for absorbing current ripples flowing through said electric motor is mounted on a peripheral portion of said power circuit board and located in a cutout portion formed in said control circuit board.

7. The electric power steering apparatus of claim 1, wherein
  (A) said electric motor includes motor winding terminals extending from said electric motor toward said heat sink,
  (B) said insert-molded wiring conductors includes winding terminals connected with said motor winding terminals at the inner side of the fitting portions of said heat sink and said speed-reduction mechanism fitted together.

8. The electric power steering apparatus of claim 7, wherein the electric power steering apparatus further comprises a current detecting means is mounted on said control circuit board near a position at which said winding terminals connected with said motor winding terminals, and wherein an electrical current flowing through said electric motor is detected, based on the current flowing through said motor winding terminal.

9. The electric power steering apparatus of claim 8, wherein said motor winding terminals includes a U-shaped portion, and said current detecting means includes a magnetic current detecting device disposed on said control circuit board at the one side of said U-shaped portion, and a magnetic collector made of a ferromagnetic material disposed on opposite side of the U-shaped portion.

10. The electric power steering apparatus of claim 8, wherein said current detecting means includes a C-shaped magnetic collector made of a ferromagnetic material forming an opening between its both opening ends and a magnetic current detecting device mounted on said control circuit board within said opening of said C-shaped magnetic collector, and wherein said motor winding terminals includes a U-shaped portion magnetic coupled with said C-shaped magnetic collector.

\* \* \* \* \*